US008060491B2

(12) United States Patent
Naaman et al.

(10) Patent No.: US 8,060,491 B2
(45) Date of Patent: Nov. 15, 2011

(54) AUTOMATIC EXTRACTION OF SEMANTICS FROM TEXT INFORMATION

(75) Inventors: Mor Naaman, San Francisco, CA (US); Tye Rattenbury, San Francisco, CA (US); Nathaniel Good, Albany, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/014,874

(22) Filed: Jan. 27, 2011

(65) Prior Publication Data

US 2011/0125761 A1 May 26, 2011

Related U.S. Application Data

(63) Continuation of application No. 11/847,848, filed on Aug. 30, 2007, now Pat. No. 7,899,804.

(51) Int. Cl.
G06F 7/00 (2006.01)
G06F 17/30 (2006.01)
(52) U.S. Cl. ........................................ 707/708; 707/736
(58) Field of Classification Search .................. None
See application file for complete search history.

(56) References Cited

U.S. PATENT DOCUMENTS

| 6,804,684 | B2 * | 10/2004 | Stubler et al. | 1/1 |
| 7,162,055 | B2 * | 1/2007 | Gu et al. | 382/103 |
| 7,184,959 | B2 * | 2/2007 | Gibbon et al. | 704/270 |
| 2003/0195883 | A1 * | 10/2003 | Mojsilovic et al. | 707/6 |
| 2007/0266304 | A1 * | 11/2007 | Fletcher et al. | 715/500.1 |
| 2008/0018503 | A1 * | 1/2008 | Kim et al. | 341/50 |

* cited by examiner

Primary Examiner — Pierre Vital
Assistant Examiner — Loan T Nguyen
(74) Attorney, Agent, or Firm — Seth H. Ostrow; Ostrow Kaufman LLP

(57) ABSTRACT

The present invention provides systems, methods and computer program products for extracting semantic information from text data having metadata associated therewith. A method according to an embodiment of the present invention includes selecting an ordered set of scale values for a plurality of scales and, for each of the scale values, determining one or more subset of metadata information related to the scale value. For each of the scales and associated subsets, a statistic on occurrences of content associated with the metadata in each subset is determined and the statistics are aggregated for each scale and associated subsets to determine a semantic level for the content. The scales and associated subsets having content with a semantic level above a threshold may be determined to extract semantic information across multiple time frames with the ordered set of scale values for the plurality of scales.

20 Claims, 3 Drawing Sheets

AUTOMATIC EXTRACTION OF SEMANTICS FROM TEXT INFORMATION

CLAIM OF PRIORITY

This application is a continuation of and claims priority to U.S. patent application Ser. No. 11/847,848, filed Aug. 30, 2007, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to data determination operations from defined data sets. More specifically, systems, methods and computer program products in accordance with embodiments of the present invention are directed towards determining semantic information from text data having metadata associated therewith.

BACKGROUND OF THE INVENTION

With the continued proliferation of various types of content items available on the Internet, there are ever-increasing benefits and a subsequent reliance on data determination techniques to help sort or otherwise categorize content. One technique for classifying content items includes user generated content or user supplied content, such as users entering tag information associated with existing data sets or content items.

A classic example is an online photograph database that includes voluminous amounts of user-posted photographs, such as the web site "www.flickr.com." Users can enter tag data relating to a given photograph, such as for example entering an event associated with the given photograph (e.g., Fourth of July Parade, Christmas, etc.), location of the given photograph (e.g. San Francisco, Golden Gate Bridge, Fisherman's Wharf, etc.), or any other suitable information that otherwise describes the photograph, which is but one example of a content item.

Through the posting of content items on the Internet, there are vast amounts of content structured in accordance with various disparate formats. It can be extremely beneficial to provide techniques for categorizing or otherwise organizing this information. Using the example of tag data, one current technique is to make the tag data available as searchable or otherwise categorical content, such as in the form of metadata that describes a given content item. In this example, a person may perform keyword searching of metadata. This technique, however, is highly restrictive and fails to provide any type of large scale content recognition with the overall data set. For example, a static search may only return items having the exact search terms associated with the content item, while overlooking potentially vast amounts of relevant data.

The current challenge facing tagging systems is to extract structured information from the unstructured, user specified tags. Unlike category or ontology based systems, tags result in unstructured knowledge having no a-priori semantics. This unstructured nature, however, allows greater user-flexibility in entering tag data, as well as allowing data to naturally evolve to reflect emergent properties of the data. Despite the lack of ontology and semantics, patterns and trends can emerge that allow for the extraction of some amount of structured information from tag-based systems. One technique is tag-based determination over spatial and temporal patterns, such as geo-referenced or geo-tagged content items.

There are existing techniques relating to the extraction of patters or trends from tag data associated with photographic collections. These techniques provide for recognizing semantic information, but are limited to a single collection of images, or stated another way, are based on a single camera. Some techniques include time-based event detection, where other techniques may include GPS data to assist in geographic information, but again are limited to single data sets. Related techniques are also recognized in the field of GeoIR, such as attempting to extract geographic information from content items on the basis of links to or from the content item, network properties and geographic terms on the site itself that hosts the content item.

Existing data sets may include two basic elements, the data itself (content item) and tag data, such as the example of a photograph and tag data associated with the photograph. For ease of understanding, the following techniques are described relative to photographs, but it is understood that these techniques are equally applicable to any suitable type of content item having metadata associated therewith. A given geotagged photo has, in addition to other metadata, location data ("lp") and time data ("tp") associated therewith. Tags associated with the photos are a second element type in the dataset, using the variable x to denote a tag, where a given photograph can have multiple tags associated therewith and a given tag can be associated with more then one photo.

Based on the location and times associated with photographs, the location and time distributions for a given photograph is:

$$Lx \stackrel{\Delta}{=} \{lp | p \text{ is associated with } x\} \quad \text{EQUATION 1:}$$

$$Tx \stackrel{\Delta}{=} \{tp | p \text{ is associated with } x\} \quad \text{EQUATION 2:}$$

With this information, the existing techniques can attempt to derive time and place semantics from the tag location Lx and time Tx usage distributions.

Two different types of scan methods are known to determine semantic information, both with associated shortcomings. A first technique is referred to as the naïve scan method, which uses standard burst detection methods utilized in signal processing. This method computes the frequency of usage for each time segment at each scale and identifies a burst when the frequency of data in a single time segment is larger than the average frequency of data over all segments, plus a multiplier applied to the standard deviation of segment frequencies, e.g., two times the standard deviation.

One problem with the naïve scan method is that tags may have sparse usage distributions, which results in low average frequencies and low standard deviations. Therefore, this method suffers from too many false positives. One solution is to compute the average and standard deviation values from aggregate data and relax the condition that the number of tag occurrences be larger than the mean plus a multiplier applied to the standard deviation. A partial computation for each tag may be defined by:

$$\frac{T_r(x, i)}{\mu_N + 2\sigma_N} \quad \text{EQUATION 3}$$

where $\mu_N$ is the mean of $\{N_r(i)|=1 \ldots\}$ and $\sigma_N$ is the standard deviation of $\{N_r(i)|=1 \ldots\}$. Using this technique, segments of time corresponding to an event are identified by simply recording the segments that pass a significance test. The significance test includes aggregating the partial computation statistics for each time segment at each scale to determine whether a given tag denotes an event.

An alternative approach, referred to as Naïve Scan II, compares the individual tag occurrences to the total number of tag occurrences, instead of the number of photograph occurrences. This technique is based on the assumption that if tag x captures the important aspects of a photo, then that photo will require few tags in addition to tag x. This partial computation may be defined by:

$$\frac{T_r(x, i)}{\mu_T + 2\sigma_T} \quad \text{EQUATION 4}$$

where $\mu_T$ is the mean of $\{N_r(i)|=1 \ldots\}$ and $\sigma_T$ is the standard deviation of $\{N_r(i)|=1 \ldots\}$.

Another technique is referred to as the spatial scan method, which includes a standard application of the spatial scan statistic technique used in epidemiology. This technique is a burst detection method and assumes an underlying probability model of observing some phenomenon over some domain. The method then tests whether the number of occurrences of a phenomenon is abnormal relative to the underlying probability model.

The spatial scan statistic technique, as well as the naïve scan methodologies, suffers from the basic problem of being defined within defined time segments. That is, these methods determine segments of time for each scale independent from the actual usage distribution of the tags. More specifically, these methods only address a-priori time segments as the time of events and may actually hide the actual time of an event by splitting the usage occurrences into adjacent segments, none of which rises above the defined threshold.

Therefore, there exists a need for a technique for extracting semantic information from tag data that can depend on or account for multiple scales, which may include accounting for the multiple scales in a simultaneous or substantially simultaneous fashion.

SUMMARY OF THE INVENTION

Generally, the present invention overcomes the limitations of the prior techniques and provides for extracting semantic information from text data having metadata associated therewith. According to one embodiment, text data comprises tag data, which may describe a content item, such as a photograph, a video, an image, etc. Alternatively, or in conjunction with the foregoing, a given content item may comprise text data, which may be associated with metadata, e.g., a blog posting with associated timestamp information or geocoding information.

Methods in accordance with embodiments of the present invention include selecting an ordered set of scale values for a plurality of scales. The present invention includes, for each of the scale values, determining one or more subsets of metadata information related to the scale value. Embodiments of the present invention further include, for each of the scales and associated subsets, determining a statistic regarding occurrences of content associated with the metadata in each subset, aggregating the statistics for each scale and associated subsets to determining a semantic level for the content. The present invention may further include determining the scales and associated subsets having content with a semantic level above a threshold value. Accordingly, embodiments of the present invention include extracting the semantic information across multiple time frames with the ordered set of scale values for the plurality of scales.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
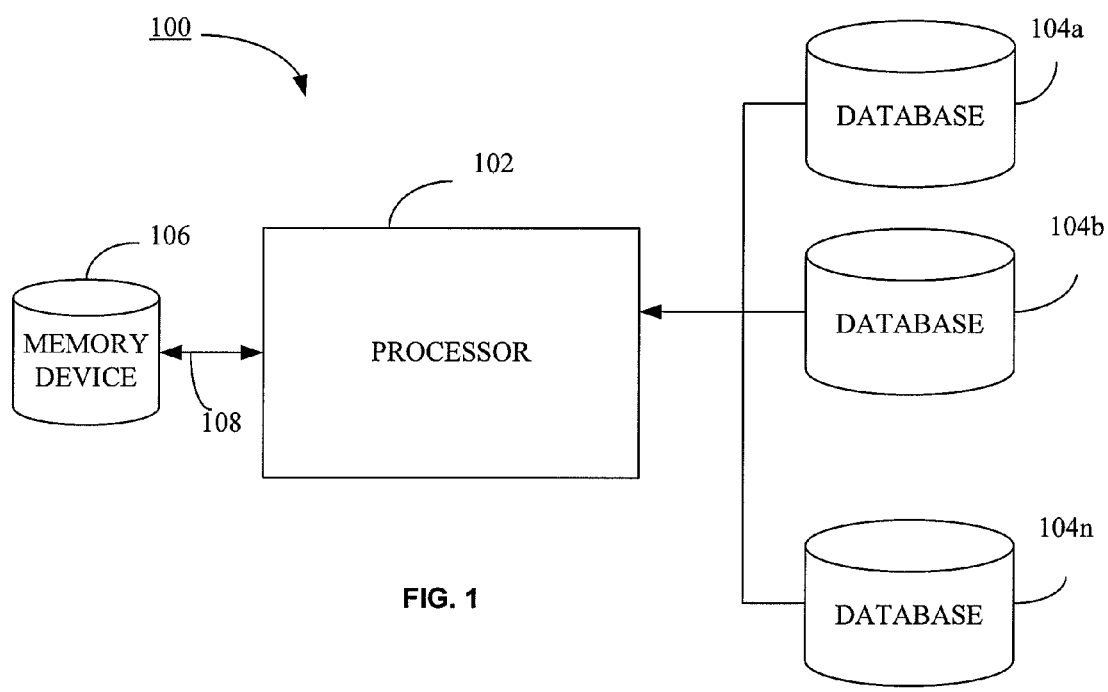
FIG. 1 illustrates a block diagram of a computing system operative to perform processing operations for extracting semantic information from tag data according to one embodiment of the present invention.

FIG. 1 illustrates one embodiment of an apparatus 100 for extracting semantic information from tag data having metadata associated therewith. The system 100 includes a processor 102, a number of databases 104a, 104b, 104n (where n is may be any suitable integer number), and a memory device 106. Not specifically illustrated, the system 100 may be embedded within or in communication with a larger computer system or environment or may, in another embodiment, be disposed across one or more computing systems, such as the processor 102 accessing the databases 104 in a local or networked manner.

The tag semantic processor 102 may comprise one or more processing elements operative to perform computation operations in response to executable instructions 108 received from the memory device 106. The memory device 106 may be any suitable type of memory device having instructions stored therein, such as for example a computer readable medium.

Figure 2:
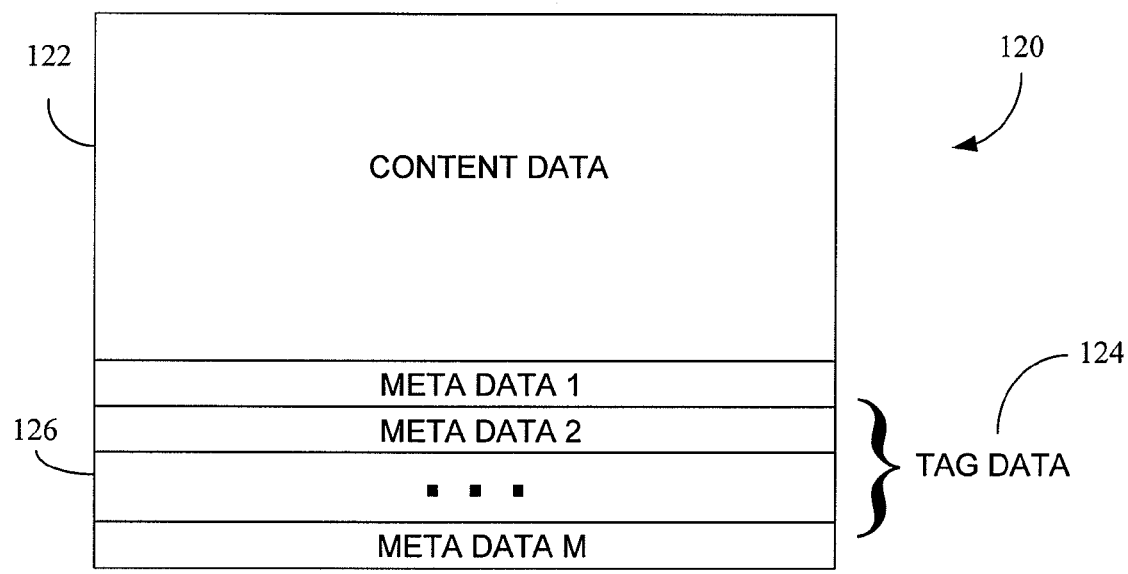
FIG. 2 illustrates a block diagram of a data element having tag data with metadata associated therewith according to one embodiment of the present invention.

The databases 104a, 104b and 104n (collectively referred to as 104) may comprise any suitable type of data storage device having content data with associated tag data stored therein. By way of example, FIG. 2 illustrates a block diagram of data 120 that a given database 104 may be operative to store, the data 120 including content data 122 and tag data fields 124 comprising metadata 126. In one example, the content data 122 may be image data representing a photograph, video data representing a movie, multimedia data representing a web page, etc., with the metadata 126 describing aspects of the content data, such as an event, the location of the event or other associated descriptors. The metadata 126 may comprise any type of information describing the content item, such as for example time, location, visual features, audio features, and edit history, etc.

Referring back to FIG. 1, the databases 104 may be centrally located or located in a distributed fashion. For example, the databases 104 may relate to different online data locations. Using the example of image data, the databases 104 may relate to one or more photograph hosting web sites accessible over the Internet. Interconnections between the processor 102 and the databases 104 may be moderated using known data transfer and communication techniques, whereby the processor 102 is operative to perform processing operations, as described in greater detail below, on the data 120 (of FIG. 2) stored in a given databases 104.

The system 100 of FIG. 1, through operations described in greater detail below, facilitates the automatic extraction of semantics from tags by executing processing operations on the underlying metadata. Examples of metadata may be time and location information associated with various types of content items, such as for example video content, photographic content and audio recordings. In other embodiments, additional types of metadata may be recognized and processed, as well as various other types of content items, such as web pages, user generated content, wiki-based content and web logs, by way of example.

The processing operations described herein apply to any content items that have associated metadata. This metadata may be treated abstractly as a mathematical metric domain and may also be derived from the content item or may be additional or transcendental with regard to the content item. For example, if the content item comprises a set of text-based tags and the metadata is the time when the tags were used or applied, then the methodology detects, derives or otherwise identifies those tags in the content that are heavily used in small subsets of time, indicating that they may correspond to various types of events. Likewise, if the content is a set of text-based tags and the metadata is the location where the tags were used or applied, then the methodology detects, derives or otherwise identifies those tags that are heavily used in small subsets of space, indicating that they may correspond to places.

Figure 3:
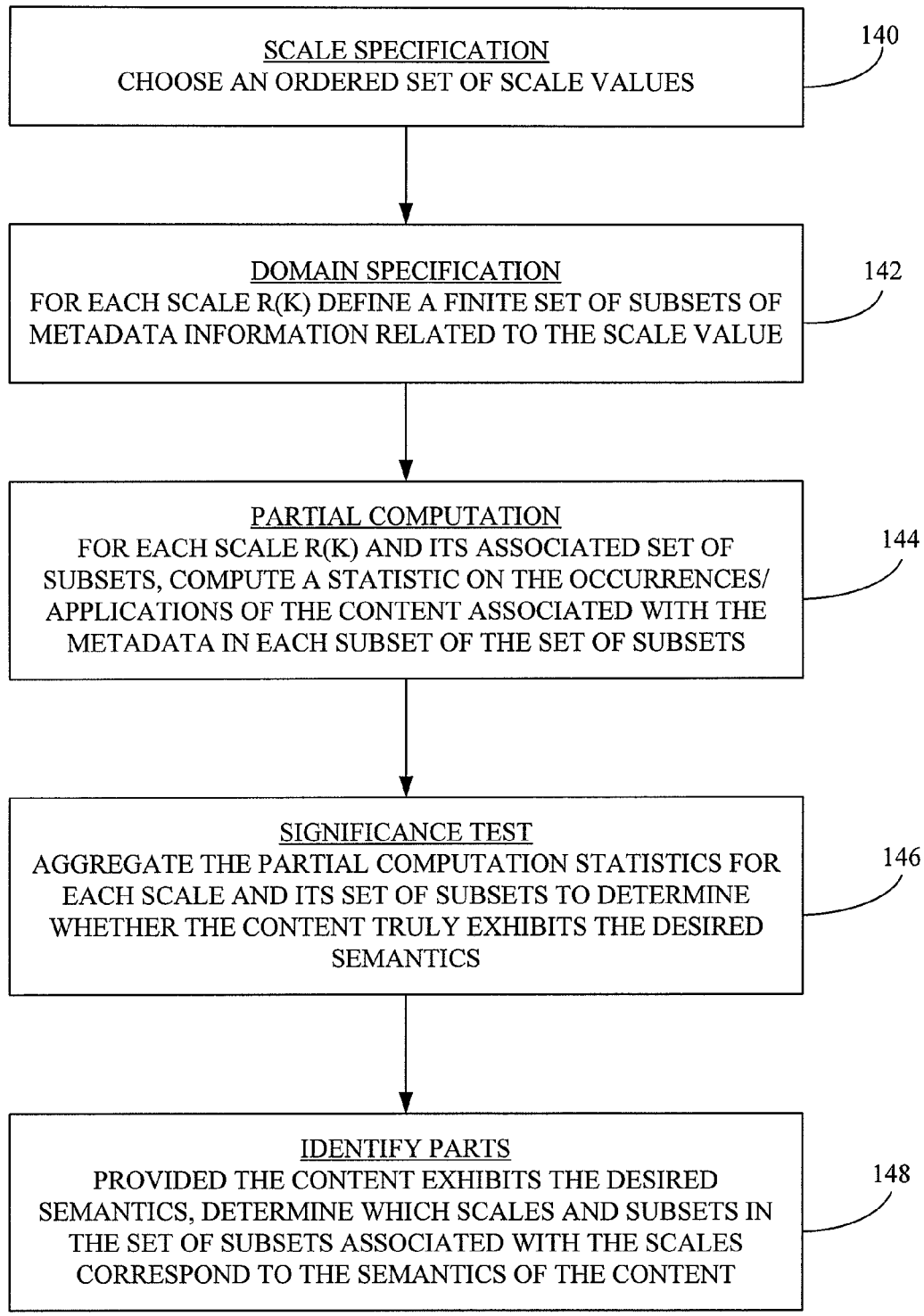
FIG. 3 illustrates a flowchart of a method for extracting semantic information from tag data having metadata associated therewith according to one embodiment of the present invention.

FIG. 3 presents a flow diagram illustrating the steps of a method for extracting semantic information from tag data having metadata associated therewith in accordance with one embodiment of the present invention. As noted above, the processor 102 of FIG. 1 may perform these processing operations in response to the executable instructions 108, the operations performed on data 120 of FIG. 2 received from the databases 104.

According to the method of FIG. 3, a scale specification is identified that includes choosing an ordered set of scale values, step 140. The ordered set of scale values are selected for a plurality of scales. For example, two scales based on time may be selected, such days and weeks. Scale specification may be illustrated by the following equation:

$$R = \{r_k | k=1 \ldots K, r_{k1} > r_{k2} \Leftrightarrow k_1 > k_2\} \qquad \text{EQUATION 5:}$$

The next step, step 142, is the domain specification step, which includes that for a given scale, $r_k$, defining a finite set of subsets of metadata information related to the scale value. This step may also include determining at least one subset of metadata relating to the scale value. Using the above example of sets being days, subsets may be day-sized intervals that overlap by no more than half a day for the day-size scale and into week-sized chunks that overlap by no more than one day for the week-size scale.

In one embodiment, the next step, step 144, includes a partial computation whereby for a given scale, $r_k$, and its associated set of subsets, the step includes computing a statistic of the occurrences or applications of the content associated with the metadata in each subset of the sets of subsets. In one embodiment, this statistic could be a simple count (or a more complex statistic) whereby the statistic corresponds to a reasonable semantic over the content and its metadata. The partial computation operation allows for determining the number of occurrences in each subset, in one example each subset is a period of time for each scale.

A next step, step 146, is a significance test that includes aggregating the partial computation statistics for a plurality of scales and an associated set of subsets to determine whether the content truly exhibits the desired semantics. This step may also include aggregating the statistics for each scale and associated subsets to determine a semantic level for the content. In one embodiment the significance test may include taking the maximum number of occurrences over all the subsets of time and test whether the occurrences exceed a threshold value. This test may be performed separately for a given scale.

A next step, step 148, includes identifying parts, wherein provided the content exhibits the desired semantics, the step includes determining which scales and subsets in the set of subsets associated with the scales correspond to the semantics of the content. This determination may be based on the scales and associated subsets having content with a semantic level above the threshold value. If the semantic levels are above the threshold, the step may include identifying one or more chunks of time that had more occurrences then the threshold and returning these as the chunks of time where the tag appeared to describe an event.

According to one embodiment, the methodology of FIG. 3 performs a significance test (step 146) that depends on multiple scales simultaneously and does not rely on time segments defined a-priori. In this methodology, as well as operations performed by the processor 102 in response to executable instructions 108, if tag x is an event, then the points in Tx (the time usage distribution) appear as a single cluster at many scales. Although the clustering mechanism used may be similar to the clustering mechanism in the scale-space methodology described in "Scale Space filtering" in Proc. Int'l Joint Conf. Artificial Intelligence, p. 1019-1022 (1983) by A. Witkin, the current embodiment relates to robustness of a single type of structure (e.g., a single cluster), as compared with Witkin's exhibiting robustness over a range of scales.

For example, consider the distribution over Tx where edges between points exist if and only if the points are closer together then r, where r is the scale variable. Letting Yr be the set of connected components in this graph, the partial computation step (step 144) computes the entropy of Yr for each scale r. The partial computation statistic may be defined as:

$$\hat{E}_r = \Sigma_{Y \in Yr}(|Y|/|Tx|)\log_2(|Tx|/|Y|) \qquad \text{Equation 6:}$$

This entropy value is a measurement of how similar the data is to a single cluster since entropy increases as data becomes more distributed. Embodiments of the present methodology prefer low entropy structures Yr, noting that Er=0 when the usage distribution is a single cluster, e.g., |Yr|=1. For place identification, the methodology replaces Tx with Lx in the calculation of Er. Accordingly, the methodology computes the distance between points Lx as the $L_2$ distance between the points.

In this methodology, periodic events can have strong clusters at multiple scales that are evenly spaced apart in time. Practically, because tags occur in bursts, the methodology provides that a periodic tag should exhibit at least three strong clusters to rule out tags that just happen to occur in two strong temporal clusters but are not truly periodic. This technique may be prone to false negatives, e.g. recurring events that only appear twice in the dataset, but this technique may be beneficial due to the sporadic nature of the data.

The methodology may also check for periodic events by any number of techniques. One technique is to identify strong clusters, for example clusters that contain at least some pre-determined percentage (e.g. 2%) of the data. Another technique may measure how far apart strong clusters appear. Another technique is ensuring that the cluster variances are not excessively large relative to the distances between clusters, for example, a standard deviation of the usage distribution for each cluster may be defined to be smaller then a defined percentage (e.g. 10%) of the average inter-cluster distance. Another technique is to ensure that the distances between clusters are even, for example the standard deviation of inter-cluster distance is smaller than a defined percentage (e.g. 10%) of the average inter-cluster distance.

If a tag's temporal distribution passes the above tests, the methodology may include re-computing the scale structure for the tag by treating time as a modulo $\mu$, the average inter-cluster distance. Accordingly, the methodology may recompute the value Yr from:

$$\hat{T'x} = \{t \bmod \mu | t \in T_x\} \quad \text{EQUATION 7:}$$

based on the metric:

$$\|t_1-t_2\| \stackrel{\Delta}{=} \min(|t_1-t_2|, |\mu+t_1-t_2|, |\mu+t_2-t_1|) \quad \text{EQUATION 8:}$$

whereby the modulo adjustment aligns the strong clusters so that they will be treated as a single cluster. For example, if a temporal distribution for a given tag has three strong clusters that are on average 365 days apart, the modulo adjustment to time corresponds to the cyclical calendar year.

In one embodiment of the present invention, the significance test (step 146) aggregates the partial computation statistics by summing them over a set of scales:

$$\Sigma_{k=1}^{K} E_{rk} \quad \text{EQUATION 9:}$$

This summed value may then be tested against a threshold to determine if the tag is an event. By recording the scale structures at each scale, the methodology may determine which time segments strongly characterize an event tag, as in the step 148. Accordingly, the methodology may characterize the place or the event to which the tag refers at multiple scales.

Extraction of semantic information, such as event and place semantic information, can assist many different applications in the data retrieval domain and beyond. For example, in the photograph data domain, the technique may improve image searching through inferred query semantics, automated creation of place and event gazetteer data used, for example, to improve regular web search by identifying relevant spatial regions and time spans for particular regular web search by identifying relevant spatial regions and time spans for particular keywords. Another benefit in the photograph domain is improved photograph collection visualization by location or event/time, as well as support for tag suggestion for photos or other resources based on location and time of capture. Another benefit is the automated association of missing location or time metadata to photographs or other resources, based on tags or caption text.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms memory and/or storage device may be used to generally refer to media such as a random access memory (RAM); a read only memory (ROM); a removable storage unit (e.g., a magnetic or optical disc, flash memory device, or the like); a hard disk; electronic, electromagnetic, optical acoustical; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for extracting semantic information from unstructured text associated with a plurality of content items, each content item having associated metadata, the method comprising:

selecting an ordered set of scale values for a plurality of scales;

determining for each scale value at least one subset of metadata from one or more content items related to the scale value;

determining for each of the scales a statistic on occurrences of the one or more content items associated with the subset of metadata, the statistic comprising a number of instances of the one or more content items in a respective scale;

aggregating the statistics for each scale and determining therefrom a semantic level for each scale;

determining which of the plurality of scales correspond to the semantics of the one or more content items on the basis of the semantic level;

identifying one or more clusters of scales having a semantic level that exceeds a threshold value of occurrences; and extracting semantic information from the metadata associated with the one or more content items of one or more identified cluster of scales.

2. The method of claim 1, wherein the text associated with the content items comprises tag data input by one or more users.

3. The method of claim 2, wherein the at least one content items is at least one of audio, a video, and a photograph.

4. The method of claim 2, wherein the semantic information includes location data.

5. The method of claim 2, wherein the semantic information includes event data.

6. The method of claim 1, wherein the metadata comprises time information regarding a time the at least one content item was created.

7. The method of claim 1, wherein the metadata comprises location information regarding a location the at least one content item was created.

8. Computer readable media comprising program code that when executed by a programmable processor causes the processor to execute a method for extracting semantic information from unstructured text associated with a plurality of content items, each content item having associated metadata, the computer readable media comprising:

program code for selecting an ordered set of scale values for a plurality of scales;

program code for determining for each scale value at least one subset of metadata related to a subset of the scale value;

program code for determining for each of the scales and associated subsets a statistic on occurrences of one or more content items from the subset of metadata, the statistic comprising a number of instances of the one or more content items in a respective scale and subset;

program code for aggregating the statistics for each scale and associated subsets and determining therefrom a semantic level for each scale and associated subsets;

program code for determining which of the plurality of scales correspond to the semantics of the one or more content items on the basis of the semantic level;

program code for identifying one or more clusters of scales and having a semantic level that exceeds a threshold value of occurrences; and program code for extracting semantic information from the metadata associated with the one or more content items of one or more identified cluster of scales.

9. The computer readable media of claim 8, wherein the text associated with the content items comprises tag data input by one or more users.

10. The computer readable media of claim 9, wherein the at least one content items is at least one of audio, a video, and a photograph.

11. The computer readable media of claim 9, wherein the semantic information includes location data.

12. The computer readable media of claim 9, wherein the semantic information includes event data.

13. The computer readable media of claim 8, wherein the metadata comprises time information regarding a time the at least one content item was created.

14. The computer readable media of claim 8, wherein the metadata comprises location information regarding a location the at least one content item was created.

15. An apparatus for extracting semantic information from unstructured text associated with a plurality of content items, each content item having associated metadata, the apparatus comprising a processor and a memory device storing executable instructions thereon that when executed causes the processor to perform a method comprising:

selecting an ordered set of scale values for a plurality of scales;

determining for each scale value at least one subset of metadata related to a subset of the scale value;

determining for each of the scales and associated subsets a statistic on occurrences of one or more content items from the subset of metadata, the statistic comprising a number of instances of the one or more content items in a respective scale and subset;

aggregating the statistics for each scale and associated subsets and determining therefrom a semantic level for each scale and associated subsets;

determining which of the plurality of scales correspond to the semantics of the one or more content items on the basis of the semantic level;

identifying one or more clusters of scales having a semantic level that exceeds a threshold value of occurrences; and extracting semantic information from the metadata associated with the one or more content items of one or more identified cluster of scales.

16. The apparatus of claim 15, wherein the text associated with the content items comprises tag data input by one or more users.

17. The apparatus of claim 16, wherein the at least one content items is at least one of audio, a video, and a photograph.

18. The apparatus of claim 16, wherein the semantic information includes location data.

19. The apparatus of claim 16, wherein the semantic information includes event data.

20. The apparatus of claim 16, wherein the metadata comprises at least one of time information regarding a time the at least one content item was created and location information regarding a location the at least one content item was created.

* * * * *